United States Patent
Jung (10) Patent No.: US 10,783,182 B2
(45) Date of Patent: Sep. 22, 2020

(54) METHOD FOR PROVIDING ADVERTISEMENT USING KEYWORD OF MUSIC CONTENT

(71) Applicant: ARTISTS CARD INC., Seongnam-si, Gyeonggi-do (KR)

(72) Inventor: Yun Sung Jung, Seoul (KR)

(73) Assignee: ARTISTS CARD INC., Seongnam-si (KR)

( * ) Notice: Subject to any disclaimer, the term of this patent is extended or adjusted under 35 U.S.C. 154(b) by 134 days.

(21) Appl. No.: 16/199,892

(22) Filed: Nov. 26, 2018

(65) Prior Publication Data

US 2020/0167430 A1    May 28, 2020

(51) Int. Cl.
  *G06F 16/00*   (2019.01)
  *G06F 16/68*   (2019.01)
  *G06Q 30/02*   (2012.01)
  *G06F 16/38*   (2019.01)

(52) U.S. Cl.
  CPC ............ *G06F 16/686* (2019.01); *G06F 16/38* (2019.01); *G06Q 30/0269* (2013.01); *G06Q 30/0277* (2013.01)

(58) Field of Classification Search
  None
  See application file for complete search history.

(56) References Cited

U.S. PATENT DOCUMENTS

| | | | | |
|---|---|---|---|---|
| 2009/0228423 | A1* | 9/2009 | Hicken | G11B 27/34 706/54 |
| 2011/0238507 | A1* | 9/2011 | Ben-Rubi | G06Q 30/0277 705/14.73 |
| 2014/0200975 | A1* | 7/2014 | Agashe | G06Q 30/0601 705/14.19 |
| 2018/0190279 | A1* | 7/2018 | Anderson | G10L 15/1822 |

FOREIGN PATENT DOCUMENTS

| | | |
|---|---|---|
| KR | 10-0404301 B1 | 11/2003 |
| KR | 10-2010-0000462 A | 1/2010 |
| KR | 10-2012-0034294 A | 4/2012 |
| KR | 10-2013-0071829 A | 7/2013 |

OTHER PUBLICATIONS

An Office Action mailed by the Korean Intellectual Property Office dated Oct. 25, 2017, which corresponds to Korean Patent Application No. 10-2017-0018696 and is related to U.S. Appl. No. 16/199,892; with English translation.

* cited by examiner

*Primary Examiner* — Son T Hoang
(74) *Attorney, Agent, or Firm* — Studebaker & Brackett PC (57) ABSTRACT

A method for providing an advertisement using a keyword of music content. The method includes storing information on musicians, and one or more tags corresponding to each of the musicians in a first database, storing information on music pieces, and one or more tags corresponding to each of the music pieces in a second database, storing information on music contents in a third database, acquiring tags corre-

(Continued)

sponding to a musician and music piece corresponding to each of the music contents stored in the third database from the first database and the second database, storing the acquired tags in the third database, searching for the music contents stored in the third database using a first keyword as matching one of the one or more tags keywords stored in the third database, allocating the advertisement to the selected music contents.

8 Claims, 10 Drawing Sheets

| No. | Name | Keyword | Remark |
|---|---|---|---|
| 1 | Bach, Johann Sebastian | Bach, German, 18th century | Composer |
| 2 | Mozart, Wolfgang Amadeus | Mozart, Austria, 18th century | Composer |
| 3 | Ryu Jae-Jun | Ryu, South Korea, 21st century | Composer |
| 4 | Pennario, Leonard | Pennario, USA, 20th century | Piano |
| 5 | Piatigorsky, Gregor | Piatigorsky, Russia, USA, 20th century | Cello |
| 6 | Primrose, William | Primrose, Scotland, 20th century | Viola |
| 7 | Baker, Israel | Baker, USA, 20th century | Violin |

FIG. 5

| No. | Name | Title | Author | Author inform |
|---|---|---|---|---|
| 11 | G-line aria | Aria, grave, melody | Bach, Johann Sebastian | #1 |
| 12 | Symphony No. 40 | Passion, Romantic, Last | Mozart, Wolfgang Amadeus | #2 |
| 13 | Piano Sonata No. 13 | Quiet, Elegant, Pure | Mozart, Wolfgang Amadeus | #2 |
| 14 | Goldenberg Variation | Romantic, Sensual, Film | Bach, Johann Sebastian | #1 |
| 15 | Piano Suite | Coral, Tokata, Puka | Ryu Jae-Jun | #3 |
| 16 | No Accompaniment Cello Suite No. 3 | No Accompaniment, Pabblo, Casals | Bach, Johann Sebastian | #1 |
| 17 | Little Star Variations | Cheerful, Light, Unrest | Mozart, Wolfgang Amadeus | #2 |

| Number | Title | Recording date | Publishing date | Music piece information | Author information | Performer | Performer information |
|---|---|---|---|---|---|---|---|
| 101 | Piano Sonata No. 13 | 1952.09.24 | 2006.03.24 | #13 | #2 | Pennario, Leonard | #4 |
| 102 | Goldenberg Variation No | 1973.11.20 | 1974.11.23 | #14 | #1 | Pennario, Leonard | #4 |
| 103 | Accompaniment Cello Suite No. 2 | 1973.03.21 | 1974.07.11 | #16 | #1 | Piatigorsky, Gregor | #5 |
| 104 | Piano Suite | 2015.01.02 | 2016.07.30 | #15 | #3 | Ryu Jae-Jun | #3 |

| No. | Title | Keyword |
|---|---|---|
| 101 | Piano Sonata No. 13 | Quiet, Elegant, Pure, Austria, 18th century, Pennario, USA, 20th century |
| 102 | Goldenberg Variation | Romantic, Sensual, Film, Bach, German, 18th century, Pennario, USA, 20th century |
| 103 | No Accompaniment Cello Suite No. 3 | No Accompaniment, Pablo, Casals, Bach, German, 18th century, Piatigorsky, Russia, USA, 20th century |
| 104 | Piano Suite | Coral, Tokata, Puka, Ryu, South Korea, 21st century |

Keyword search

| German | 🔍 |

| Searched track | Number of followers/ Number of plays | Number of allocated Ad | Selected |
|---|---|---|---|
| Goldenberg Variation | 120 / 1000 | 2 | ☐ |
| No Accompaniment Cello Suite No. 3 | 25 / 150 | 0 | ☐ |

Single-time Ad duration: 15 seconds

Total Ad exposure duration: 600 Minutes

Fee confirm/payment

FIG. 9

FIG. 10

METHOD FOR PROVIDING ADVERTISEMENT USING KEYWORD OF MUSIC CONTENT

BACKGROUND

Embodiments of the inventive concept described herein relate to a method for providing an advertisement using a keyword of music content.

As methods, media, and devices to provide content become more diverse, advertisement services using the content are also diversified.

In a widely used advertisement method, traditional media such as television or radio may provide content and advertisement in a single direction only, and, thus, the advertisement is embedded in a middle of the content to provide the same.

On the other hand, in recent years, content has been provided over the Internet, and thus content may be provided via interaction with the user. Therefore, the user may not receive the content passively, but may select content desired by the user and receive the selected content.

In this process, an advertisement is played for a predetermined time before providing the selected content to the user.

However, in the traditional television or radio advertisements, advertisers could choose the program or time zone they wanted to set the advertisement. In recent approaches, advertisements are often provided regardless of the content selected by the user.

Therefore, it is required to develop a service that allows an advertiser to set a desired advertisement by selecting a desired content or a desired content type.

SUMMARY

Embodiments of the inventive concept provide a method for providing an advertisement using a keyword of music content.

The technical objects of the inventive concept are not limited to the above-mentioned ones, and the other unmentioned technical objects will become apparent to those skilled in the art from the following description.

According to an aspect of an embodiment, a method for providing an advertisement using a keyword of music content, includes storing, by a server, information on one or more musicians, and one or more keywords corresponding to each of said one or more musicians in a first database, storing, by the server, information on one or more music pieces, and one or more keywords corresponding to each of said one or more music pieces in a second database, storing, by the server, information on one or more music contents, and one or more keywords corresponding to each of said one or more music contents in a third database, acquiring, by the server, one or more keywords corresponding to a musician and music piece corresponding to each of one or more music contents stored in the third database from the first database and the second database, storing, by the server, the acquired one or more keywords in the third database, searching for, by the server, one or more music contents stored in the third database using a first keyword as one of the keywords stored in the third database, providing, by the server, a list of one or more music contents corresponding to the first keyword among said one or more music contents stored in the third database, wherein the providing of the list includes providing at least one of a number of followers, a number of plays and a number of allocated advertisements corresponding to each of said one or more music contents included in the list, receiving, by the server, an input of selection of at least some of said one or more music contents included in the list, and allocating, by the server, an advertisement to the selected music contents, wherein the keyword corresponding to the musician includes at least one of keywords indicating a name, nickname, title, institution, musical instrument, country, birth information, death information associated with the musician, and an emotional or functional expression associated with a performance of the musician, and wherein the keyword corresponding to the music piece includes at least one of keywords indicating a genre, composer, lyricist, music piece name, musical instrument, music piece number, composition, tempo, and mood associated with each music piece.

The other detailed items of the inventive concept are described and illustrated in the specification and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

The above and other aspects, features and advantages of the invention will become apparent from the following description of the following embodiments given in conjunction with the accompanying drawings. However, the inventive concept is not limited to the embodiments disclosed below, but may be implemented in various forms. The embodiments of the inventive concept are provided to make the disclosure of the inventive concept complete and fully inform those skilled in the art to which the inventive concept pertains of the scope of the inventive concept.

The terms used herein are provided to describe the embodiments but not to limit the inventive concept. In the specification, the singular forms include plural forms unless particularly mentioned. The terms "comprises" and/or "comprising" used herein does not exclude presence or addition of one or more other elements, in addition to the aforementioned elements. Throughout the specification, the same reference numerals dente the same elements, and "and/or" includes the respective elements and all combinations of the elements. Although "first", "second" and the like are used to describe various elements, the elements are not limited by the terms. The terms are used simply to distinguish one element from other elements. Accordingly, it is apparent that a first element mentioned in the following may be a second element without departing from the spirit of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

Hereinafter, exemplary embodiments of the inventive concept will be described in detail with reference to the accompanying drawings.

Figure 1:
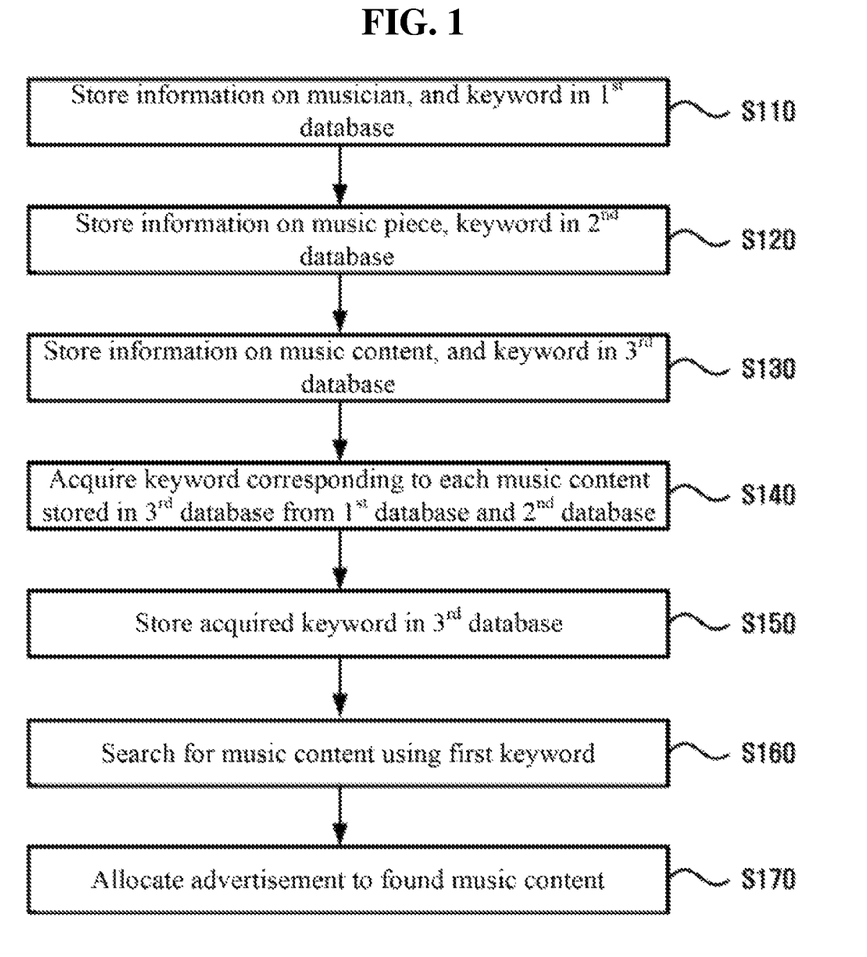
FIG. 1 is a flow chart showing a method for providing an advertisement using a keyword of music content according to one embodiment.

FIG. 1 is a flow chart showing a method for providing an advertisement using a keyword of music content according to one embodiment.

The method for providing the advertisement using the keyword of the music content shown in FIG. 1 is composed of operations performed chronologically in a computing device including a server.

In operation S110, the server stores information about one or more musician, and one or more keywords corresponding to each of one or more musicians in a first database. In a disclosed embodiment, a database refers to a collection of data that is stored in the server and is managed in an integrated manner for ease of a subsequent use.

In one embodiment, the database is composed of a data structure such as a table. However, a manner in which the database is configured is not limited thereto.

In a disclosed embodiment, musician includes author or performer. The author includes composer or lyricist.

Information about one or more author stored in the first database includes date of death of the author. Further, information about a name, date of birth, nationality, place of birth, death location and main activity field (composer, lyricist, etc.) of the author may be stored in the first database.

Information about one or more performers stored in the first database includes death date of the performer. Further, information about a name, date of birth, nationality, place of birth, death location and main activity field (musical instrument type as performed by the performer, etc.) of the performer may be stored in the first database.

The server assigns a predetermined unique number to each piece of information about one or more authors or performers stored in the first database.

In one embodiment, the keyword corresponding to musician includes a name, nickname, title, institution, musical instrument, country, birth information, death information, and various other tags of the musician. For example, a keyword corresponding to a musician may include a keyword associated with a music piece of the musician, or a keyword indicating an emotional or functional expression associated with the performance of the musician.

In operation S120, the server stores information about one or more music pieces and one or more keywords corresponding to each of one or more music pieces in the second database.

Information about one or more music pieces stored in the second database includes the title of each music piece. Further, information about one or more music pieces stored in the second database includes the name of the author of each music piece. Further, information about one or more music pieces stored in the second database may further include more specific information about each piece of music.

The server assigns a predetermined unique number to each piece of information about one or more music pieces stored in the second database.

In one embodiment, the keyword corresponding to the music piece may include a variety of keywords that may represent a genre, composer, lyricist, music piece name, musical instrument, music piece number, composition, tempo, mood, or other features of the music piece.

In operation S130, the server stores information about one or more music contents and one or more keywords corresponding to each of one or more music contents in a third database.

In a disclosed embodiment, the music content means a recorded sound source of the music piece. Thus, there may be a plurality of different music contents corresponding to a single music piece.

The information about one or more music contents stored in the third database includes the title and performer name of the music content. Further, the information about one or more music contents stored in the third database includes information about recording and publishing of each music content.

For example, the information about one or more music contents stored in the third database includes information about recording date, recording place, date of publication, country of publication, and owner of the publication of each music content.

The server assigns a predetermined unique number to each piece of information about one or more music contents stored in the third database.

In one embodiment, the keyword corresponding to the music content includes information on a genre, an album serial, an album title, and a label of each music content, a copyright holder associated with the music piece, information on all performers, and cast of the music content, recording information and publication information of the music content.

In operation S140, the server acquires one or more keywords corresponding to a musician and music piece corresponding to each of one or more music contents stored in the third database from the first database and the second database.

In one embodiment, the server acquires one or more keywords associated with the author corresponding to each of the one or more music pieces stored in the second database. The server stores the acquired one or more keywords in the second database.

Further, the server acquires one or more keywords corresponding to the author corresponding to each of the one or more music contents stored in the third database from the second database. The server acquires one or more keywords corresponding to a performer corresponding to each of one or more music contents stored in the third database from the first database.

In operation S150, the server stores one or more keywords acquired from the first and second databases in the third database.

In operation S160, the server searches for one or more music contents stored in the third database using a first keyword, which is one of the keywords stored in the third database.

In one embodiment, the server provides a list of one or more music contents corresponding to the first keyword among said one or more music contents stored in the third database. The server provides at least one of the number of followers, the number of plays and the number of set advertisements corresponding to each of the one or more music contents included in the list.

In one embodiment, the number of followers may indicate the number of users who express a like toward or separately set aside specific music content, such as setting a favorite for the specific music content, pressing a favorite button for the specific music content, or storing the specific music content into a play list.

In operation S170, the server allocates an advertisement to at least some of the found one or more music contents.

In one embodiment, the server receives input of selection of at least some of the music contents included in the list as provided. The server allocates an advertisement to the selected music contents.

When the music content having the advertisement allocated thereto is replayed, the server exposes the allocated advertisement before, during, or after the reproduction of the music content.

In a disclosed embodiment, the advertisement may include at least one of a voice advertisement, a banner advertisement, a pop-up advertisement, a video advertisement and a text advertisement, but the inventive concept is not limited thereto.

For example, while a voice or picture may be replayed for a predetermined time, an advertisement corresponding to the voice or picture as replayed may be replayed in a banner or a pop-up format.

Figure 2:
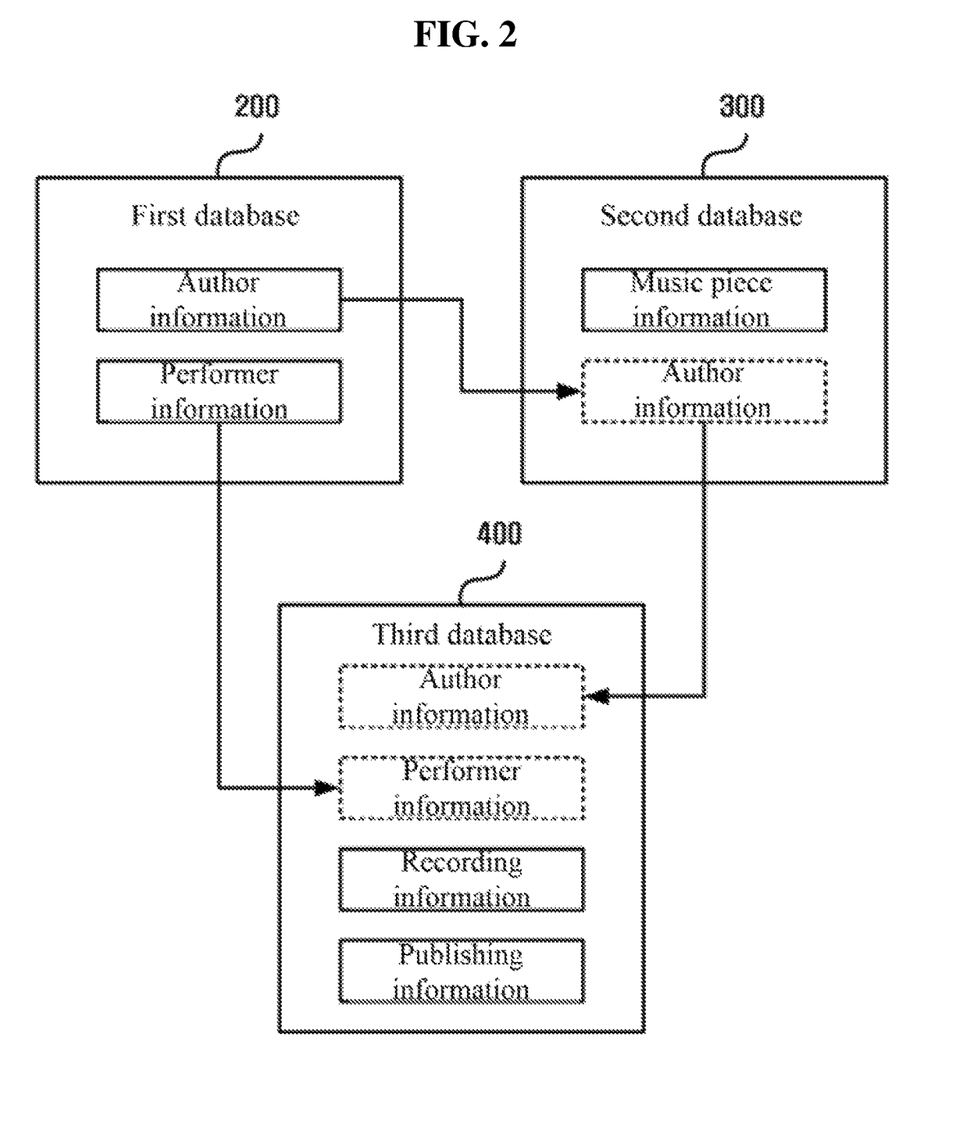
FIG. 2 shows first to third databases according to one embodiment.

FIG. 2 shows the first database to third database according to one embodiment.

Each of a first database 200, a second database 300, and a third database 400 shown in FIG. 2 refers to a set of data stored in the server.

The first database 200, the second database 300, and the third database 400 shown in FIG. 2 correspond to the first database, the second database, and the third database described in connection with FIG. 1, respectively.

Therefore, the description of the first database, the second database, and the third database with reference to FIG. 1 though omitted with reference to FIG. 2 may be equally applied to the first database, the second database and the third database as illustrated with reference FIG. 2 and subsequent drawings.

Referring to FIG. 2, a relationship between the first database, the second database and the third database is defined.

The first database 200 stores musician information. In one embodiment, the first database 200 stores author information and performer information.

In a disclosed embodiment, the musician information stored in the first database 200 includes a keyword corresponding to each musician.

The second database 300 stores information about each music piece.

In one embodiment, the second database 300 stores the title, author name, and one or more keywords for each music piece.

The server acquires specific information about an author and a keyword corresponding to the author from the first database 200 using the author name in the second database 300. The second database 300 stores an identifier for acquiring author information stored in the first database 200.

In another embodiment, the second database 300 may store author information and keywords acquired from the first database 200.

The third database 400 stores information about each music content.

In one embodiment, the third database 400 stores the title, recording information, publication information, performer name, and one or more keywords for each music content The server acquires the music piece information and a keyword corresponding to the music piece from the second database 300 using the title of each music content stored in the third database 400. Further, the server acquires, from the first database 200 linked with the music piece information stored in the second database 300, author information, and a keyword corresponding to the author. The third database 400 stores an identifier for acquiring music piece information stored in the second database 300.

In another embodiment, the third database 400 may store music piece information acquired from the second database 300, author information acquired from the first database 200, and keywords corresponding to the obtained music piece information and author information.

The server acquires performer information and a keyword from the first database 200 using the performer name of each music content stored in the third database 400. The third database 400 stores an identifier for acquiring the performer information and keyword stored in the first database 200.

In another embodiment, the third database 400 may store the author information and keyword acquired from the first database 200.

Figure 3:
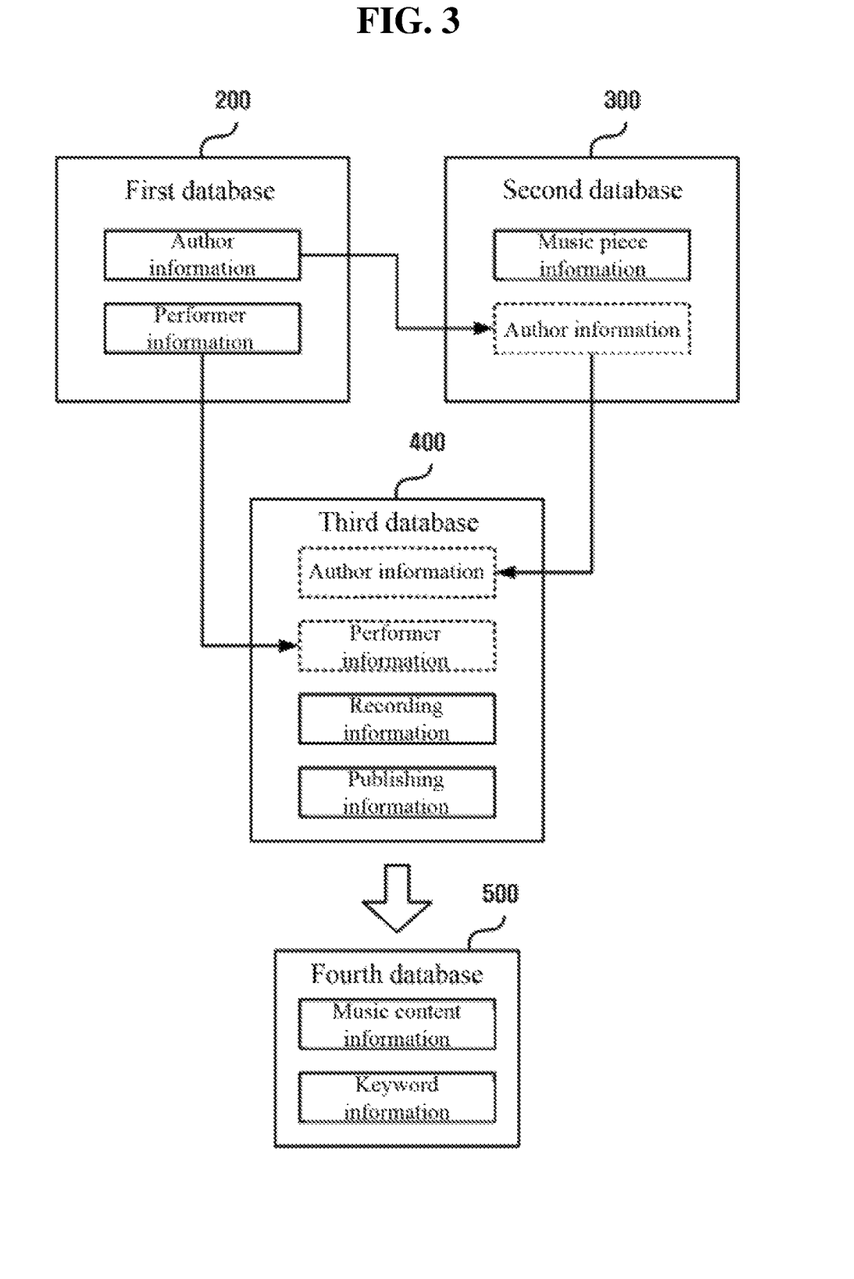
FIG. 3 is an additional illustration of a fourth database according to one embodiment.

FIG. 3 is an additional illustration of a fourth database according to one embodiment.

In one embodiment, the server generates a fourth database 500 that stores information about each music content stored in the third database 400 and a keyword corresponding to each music content.

The fourth database 500 stores the keyword for each music content. Accordingly, when the server receives a search request using the keyword, the server retrieves the fourth database 500 using the keyword and acquires music content corresponding to the keyword.

The embodiment shown in FIG. 3 is directed to a method for separately constructing the fourth database 500.

In another embodiment, the server does not create a separate fourth database 500. Instead, the server stores information about the music content, and a keyword for each music content in the third database 400.

In yet another embodiment, the fourth database 500 may refer to a database included in the third database 400.

Figure 4:
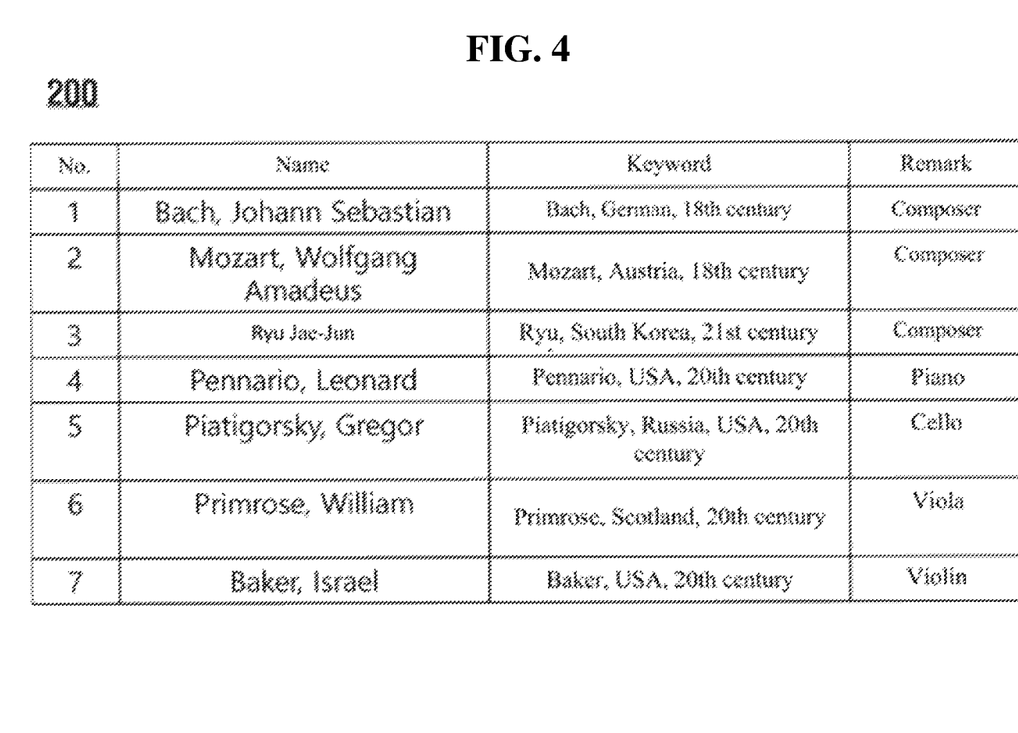
FIG. 4 shows one example of the first database.

FIG. 4 shows one example of the first database.

The first database 200 stores information about musician including author or performer. According to a disclosed embodiment, the first database 200 stores the name of each author or performer, the date of death thereof, the activity field thereof, and the unique number of each author or performer.

In one embodiment, the first database 200 stores one or more keywords corresponding to each musician. Referring to FIG. 4, keywords indicating information about the name, nationality or activity country of each musician and the major activity period thereof are stored in the first database 200.

In a disclosed embodiment, the keyword corresponding to musician includes the musician's name, nickname, title, an institution of the musician, musical instrument used by the musician, country, birth information, death information of the musician, and various other tags. For example, a keyword corresponding to musician may include a keyword indicating musical piece of the musician, or emotional or functional expressions in performance. The inventive concept is not limited thereto.

In the first database 200, a remark item stores a main activity field of each author or performer. In another embodiment, the first database 200 stores at least one activity field for each author or performer. However, the activity field of each author or performer is not limited to those stored in the first database 200.

For example, a composer may play a role as a pianist at the same time. A performer may play a role as a composer or a lyricist or may play multiple musical instruments. Thus, the activity field of each author or performer is not limited to the active position stored in the first database 200.

Figure 5:
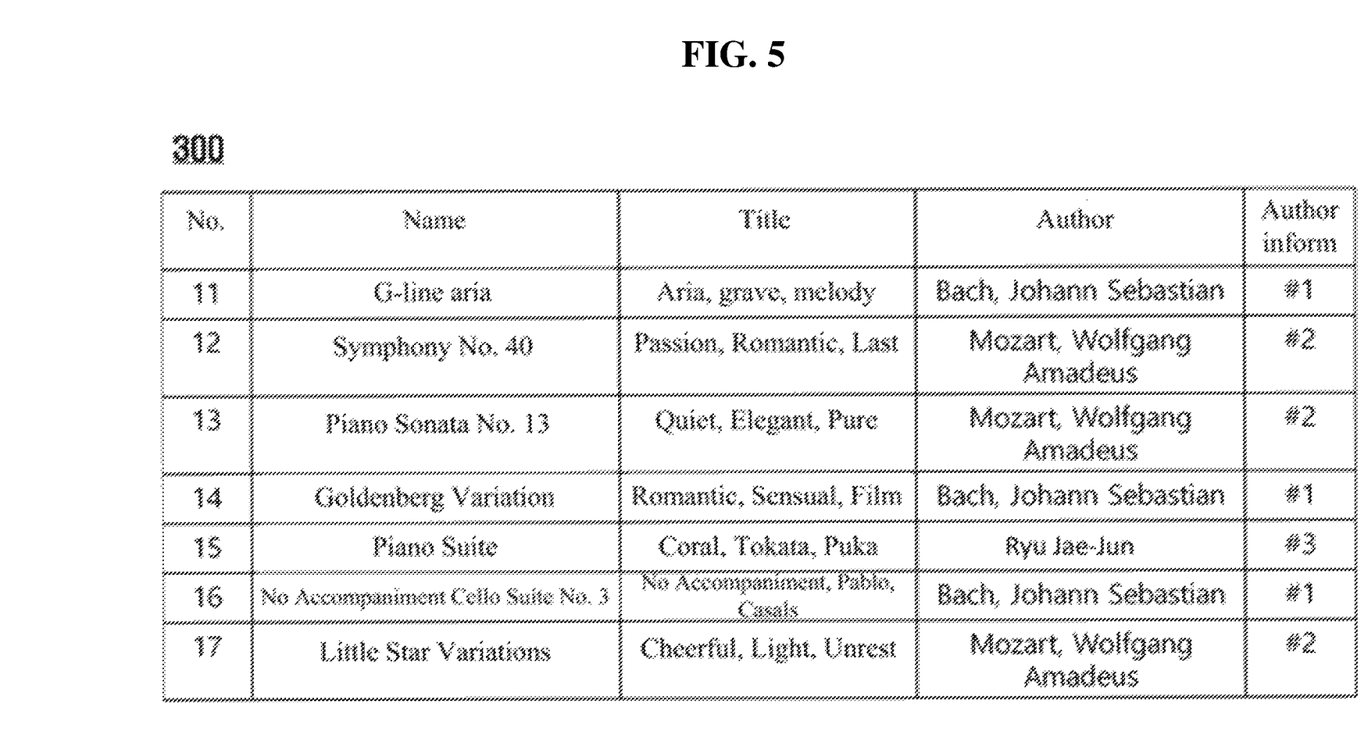
FIG. 5 shows one example of the second database.

FIG. 5 shows one example of the second database.

The second database 300 stores information about the music piece. According to a disclosed embodiment, the second database 300 stores each music piece's title, author name and a unique number of each music piece.

Further, the second database 300 stores an identifier for acquiring author information of each music piece from the first database 200.

Further, the second database 300 stores one or more keywords corresponding to each music piece. In one embodiment, the keyword corresponding to the music piece may include various keywords that may represent a genre, composer, lyricist, music piece name, musical instrument type, music piece number, composition, tempo, or other features of each musical piece.

Figure 6:
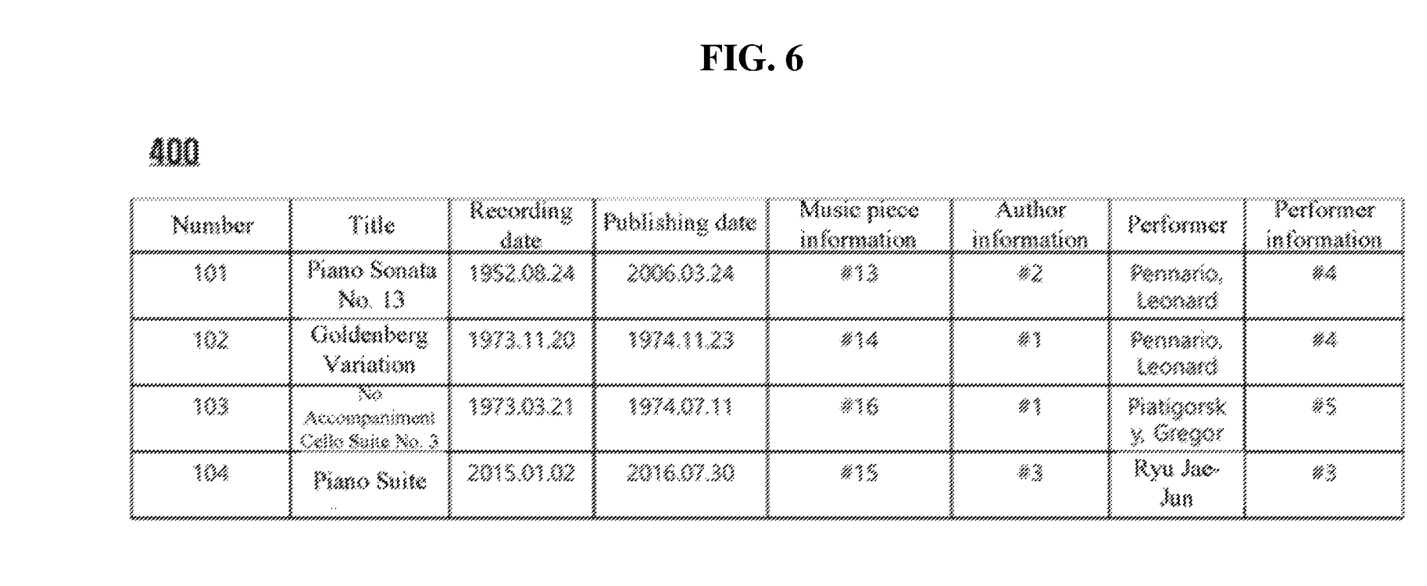
FIG. 6 shows one example of the third database.

FIG. 6 shows one example of the third database.

The third database 400 stores information about music content. According to a disclosed embodiment, the third database 400 stores the title, the recording date, the date of publication, and the performer name of each music content, and the unique number of each music content.

Further, the third database 400 stores identifiers for acquiring music piece information, and musician information corresponding to each music content, and keywords corresponding to the music piece and musician from the second database 300 and the first database 200, respectively.

In one embodiment, the server stores the acquired information about the music piece and musician and the keywords as acquired from the first database 200 and the second database 300 into the third database 400.

Figure 7:
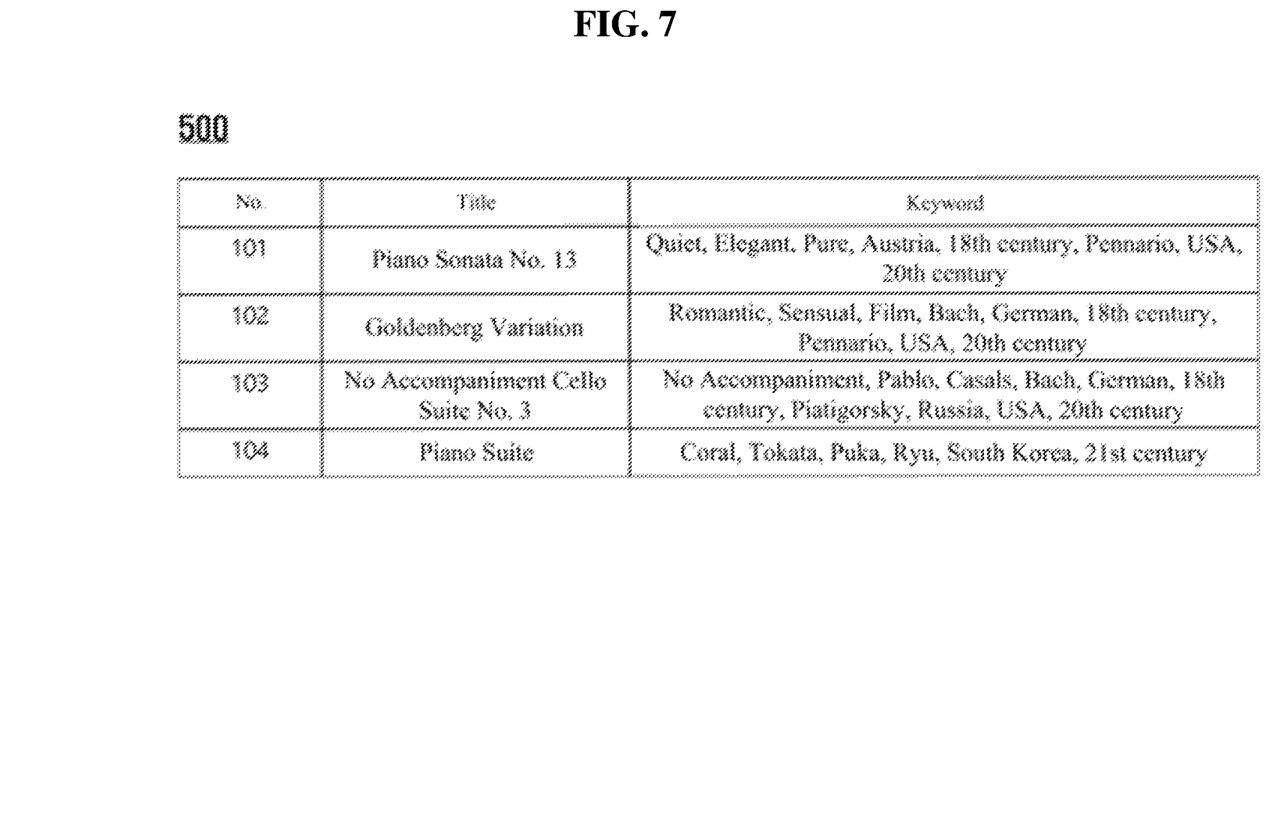
FIG. 7 shows a fourth database that stores information about each music content included in the third database and a keyword corresponding to each music content.

Referring to FIG. 7, there is shown the fourth database 500 storing information corresponding to each music content included in the third database, and a keyword corresponding to each music content included in the third database.

In one embodiment, the fourth database 500 may be included in the third database 400. For example, the fourth database 500 may be composed of at least one column of the third database 400.

Referring to FIG. 7, four music contents are included in the fourth database 500. The server acquires keywords corresponding to a music piece and musician corresponding to each music content from the first database 200 and the second database 300. The server stores the acquired keywords in the fourth database 500.

Figure 8:
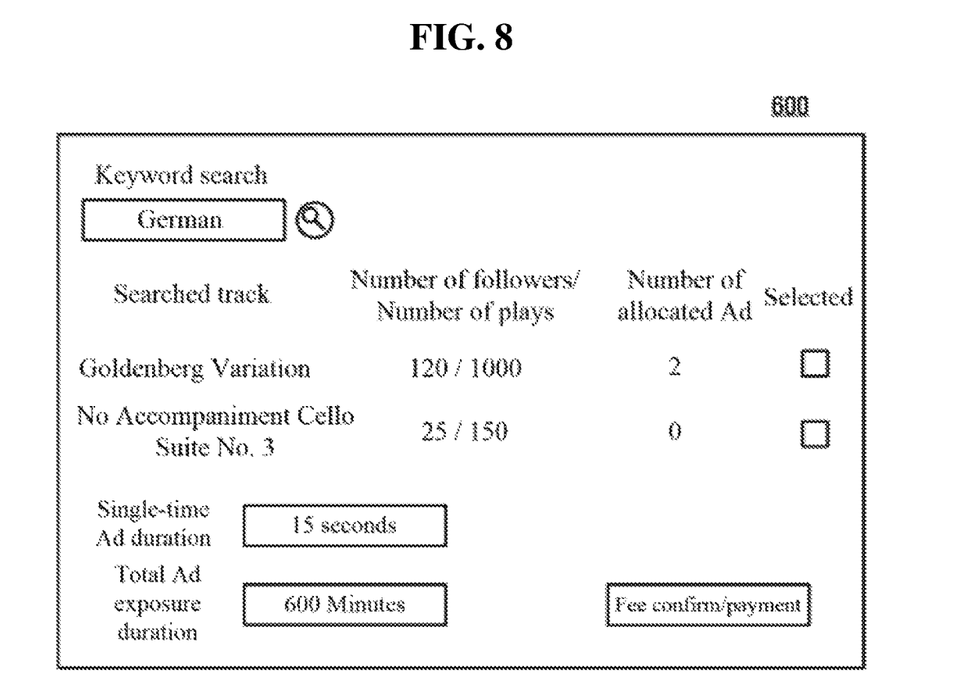
FIG. 8 shows one example of allocating an advertisement to corresponding music content using a keyword.

FIG. 8 shows one example of allocating an advertisement to music content using a keyword.

Referring to FIG. 8, a screen 600 for allocating an advertisement to music content is shown.

The advertiser searches for one or more music contents using a keyword. For example, the advertiser uses "German" keyword to search for content.

The server acquires one or more music contents corresponding to the keyword retrieved from the third database 400. The server provides a list of the acquired music contents.

Referring to FIG. 8, there are provided a list of one or more music contents corresponding to the keyword of Germany, the number of followers, the number of plays, and the number of allocated advertisements corresponding to each of one or more music contents included in the list.

The advertiser refers to the provided information to select at least some of the music contents included in the list. Then, the advertiser may request to allocate an advertisement to the selected contents.

In one embodiment, the server acquires a timing length of the advertisement (e.g., a duration per one advertisement) and a total exposure duration (total advertisement timing) of the advertisement from the advertiser.

The server determines the total number of exposures of the advertisement using the total exposure duration and a duration per one advertisement. For example, as shown in FIG. 8, when the advertisement is exposed for a total of 600 minutes, and one advertisement consumes 15 seconds, the advertisement will be exposed 2400 times in total.

In one embodiment, a time duration that a single advertisement spends may be selected in a range from a minimum of 10 seconds to a maximum of 30 seconds, but the inventive concept is not limited thereto.

The server determines an advertisement fee based on the total exposure duration of the advertisement. The advertiser pays the determined advertisement fee.

When the music content to which the advertisement is allocated is replayed, the server exposes the advertisement before, during, or after playback of the music content. When the total number of exposures for a pre-paid advertisement has been exhausted, the server no longer exposes the advertisement.

In one embodiment, when the total number of exposures of the advertisement has been exhausted, the server may request the advertiser of a further payment, or may query the advertiser of a further payment. In one embodiment, the inventive concept may be configured such that when the total number of exposures of the advertisement has been exhausted, the advertiser may automatically settle the further payment.

In one embodiment, when the total number of exposures of an advertisement for a predetermined period is not exhausted, the server may refund the money amount corresponding to the remaining number of exposures.

Figure 9:
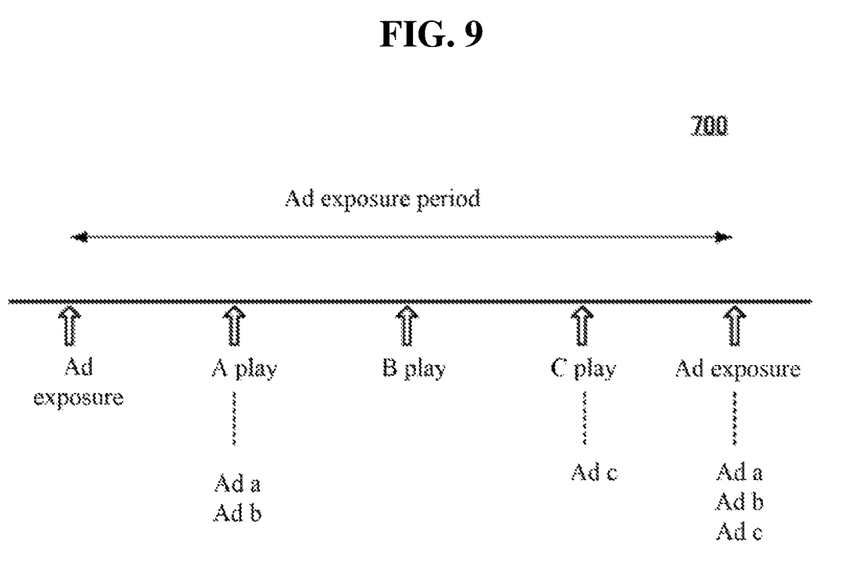
FIG. 9 shows a method for exposing an advertisement according to one embodiment.

FIG. 9 shows a method for exposing an advertisement according to one embodiment.

In one embodiment, when a plurality of advertisements are allocated to music content being played, the server selects one of the plurality of advertisements and exposes the selected advertisement. The server may randomly select one of the plurality of advertisements and expose the selected advertisement. Alternatively, the server may sequentially expose the plurality of advertisements.

In one embodiment, the server charges varying fees resulting from the exposure of the advertisement. The server may preferentially expose an advertisement of the advertiser that pays the highest fee.

In one embodiment, the server determines the advertisement exposure period corresponding to each of the listeners listening to the music content. The advertisement exposure period may be set differently depending on the listener. Alternatively, the exposure period may be set to be equal between all listeners.

In one embodiment, the advertisement exposure period may be set differentially according to the amount paid by the listener. For example, the greater the amount that a listener paid to listen to the music content, the longer the advertisement is exposed for the listener.

The server acquires one or more advertisements allocated to one or more music contents played during the advertisement exposure period. When it reaches the exposure period, the server selects one of the acquired one or more advertisements and exposes the selected advertisement.

Referring to FIG. 9, a graph 700 illustrating a method of exposing an advertisement according to an advertisement exposure period is illustrated.

In the embodiment shown in FIG. 9, three music contents including A, B and C may be played within the advertisement exposure period between an advertisement exposure and a next advertisement exposure. Further, it is assumed that an advertisement "a" and an advertisement "b" are assigned to music content A, while "e" advertisement "c" is allocated to music content C.

When the next advertisement exposure period arrives, the server exposes one of the advertisements "a", "b" and "c". The server may randomly expose one of the three advertisements. Alternatively, the server may sequentially expose the advertisements according to a fee paid by the advertiser. Alternatively, the server may preferentially expose an advertisement whose the remaining number of exposures is the highest. The inventive concept is not limited to the above.

Figure 10:
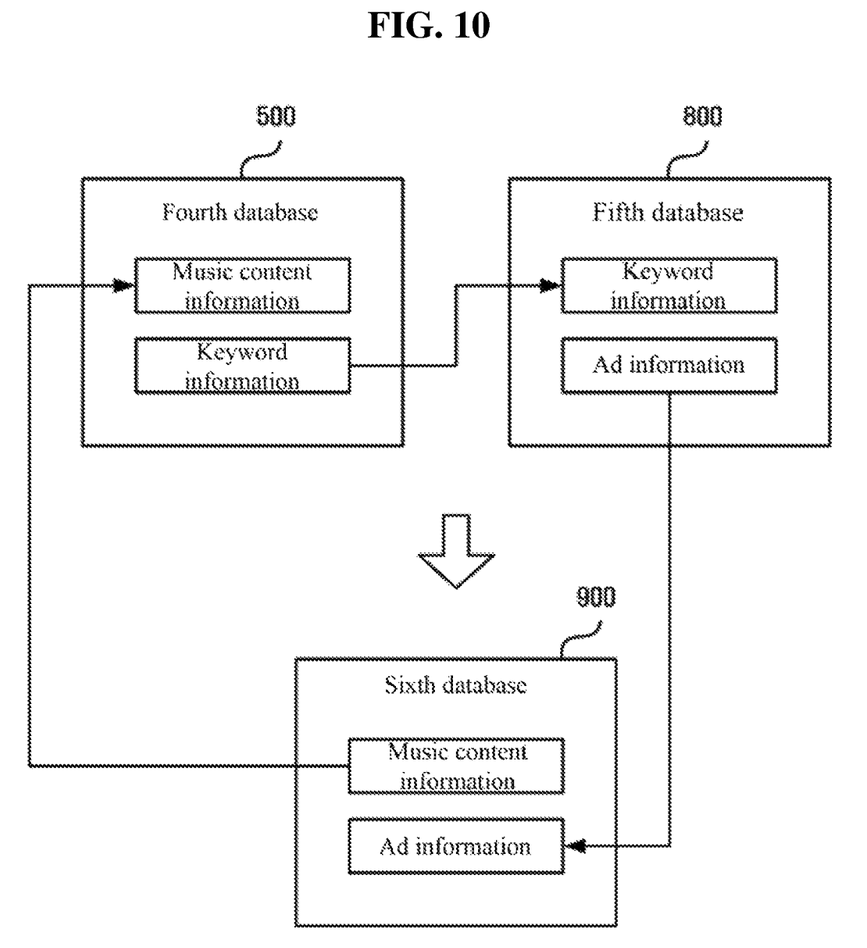
FIG. 10 is a diagram showing databases used to provide advertisements using a keyword according to another embodiment.

FIG. 10 is an illustration of databases used to provide advertisements using keywords according to another embodiment.

In a disclosed embodiment, the server retrieves music contents using a keyword. The server allocates an advertisement to at least some of the found music contents.

In another embodiment, the server may allocate an advertisement to the keyword itself.

For example, the server assigns an advertisement to "German" keyword itself. When the music content including the "German" keyword is played, the server may provide the corresponding advertisement.

Referring to FIG. 10, the fourth database 500, a fifth database 800, and a sixth database 900 are shown.

The fourth database 500 stores music content information and keyword information corresponding to each music content.

The fifth database 800 stores one or more keywords included in the fourth database 500, and information about advertisements assigned to each keyword.

The sixth database 900 stores information about one or more music contents included in the fourth database 500. The server acquires keyword information corresponding to the music content stored in the sixth database 900 from the fourth database 500. The server acquires the advertisement information corresponding to the acquired keyword information from the fourth database 500 from the fifth database 800. The server stores the advertisement information acquired from the fifth database 800 into the sixth database 900.

When the server plays specific music content, the server acquires advertisement information corresponding to the music content using the sixth database 900. The server exposes the acquired advertisement to the listener before, during or after playing the music content.

In some embodiments, the above-discussed method of FIG. 1, according to this disclosure, is implemented in the form of program being readable through a variety of computer means and be recorded in any non-transitory computer-readable medium. Here, this medium, in some embodiments, contains, alone or in combination, program instructions, data files, data structures, and the like. These program instructions recorded in the medium are, in some embodiments, specially designed and constructed for this disclosure or known to persons in the field of computer software. For example, the medium includes hardware devices specially configured to store and execute program instructions, including magnetic media such as a hard disk, a floppy disk and a magnetic tape, optical media such as CD-ROM (Compact Disk Read Only Memory) and DVD (Digital Video Disk), magneto-optical media such as floptical disk, ROM, RAM (Random Access Memory), and flash memory. Program instructions include, in some embodiments, machine language codes made by a compiler and high-level language codes executable in a computer using an interpreter or the like. These hardware devices are, in some embodiments, configured to operating as one or more of software to perform the operation of this disclosure, and vice versa.

A computer program (also known as a program, software, software application, script, or code) for the above-discussed method of FIG. 1 according to this disclosure is, in some embodiments, written in a programming language, including compiled or interpreted languages, or declarative or procedural languages. A computer program includes, in some embodiments, a unit suitable for use in a computing environment, including as a stand-alone program, a module, a component, or a subroutine. A computer program is or is not, in some embodiments, correspond to a file in a file system. A program is, in some embodiments, stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is, in some embodiments, deployed to be executed on one or more computer processors located locally at one site or distributed across multiple remote sites and interconnected by a communication network.

According to a disclosed embodiment, an advertiser may set an advertisement corresponding to a desired type of content using a keyword. The server may easily acquire content corresponding to a keyword using a relational database. The advertiser may maximize an advertisement effect by setting an advertisement corresponding to content corresponding to a keyword selected by the advertiser.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing an advertisement using one or more tags of music contents, the method comprising:
    storing, by a server, information on one or more musicians, and one or more tags corresponding to each of the one or more musicians in a first database of the server;
    storing, by the server, information on one or more music pieces, and one or more tags corresponding to each of the one or more music pieces in a second database of the server;
    storing, by the server, information on one or more music contents in a third database of the server;

acquiring, by the server, one or more tags corresponding to a musician and music piece corresponding to each of the one or more music contents stored in the third database from the first database and the second database;

storing, by the server, the acquired one or more tags in the third database;

searching for, by the server, the one or more music contents stored in the third database using a first keyword matching one of the one or more tags stored in the third database;

providing, by the server, a list of one or more music contents corresponding to the first keyword among the one or more music contents stored in the third database, wherein the providing of the list includes providing at least one of a number of followers, a number of plays and a number of allocated advertisements corresponding to each of the one or more music contents included in the list;

receiving, by the server, an input of selection of at least some of the one or more music contents included in the list; and allocating, by the server, the advertisement to the selected music contents, wherein the one or more tags stored in the first database include at least one of a name, nickname, title, institution, musical instrument, country, birth information, death information associated with the one or more musicians, and an emotional or functional expression associated with a performance of the one or more musicians; and the one or more tags stored in the second database include at least one of a genre, composer, lyricist, music piece name, musical instrument, music piece number, composition, tempo, and mood associated with the one or more music pieces.

2. The method of claim 1, wherein the one or more musicians include one or more authors and one or more performers, wherein the method further comprises:

acquiring, by the server, one or more tags corresponding to an author corresponding to each of the one or more music pieces stored in the second database; and storing, by the server, the acquired one or more tags in the second database.

3. The method of claim 2, wherein the acquiring of the one or more keyword corresponding to the author includes:

acquiring, by the server, from the second database, one or more tags corresponding to the author corresponding to each of the one or more music contents stored in the third database; and acquiring, by the server, from the first database, one or more tags corresponding to a performer corresponding to each of the one or more music contents stored in the third database.

4. The method of claim 1, wherein the method further comprises:

acquiring, by the server, a duration of a single-time exposure of the advertisement;

acquiring, by the server, a total exposure duration of the advertisement; and determining, by the server, a total number of exposures of the advertisement using the duration of the single-time exposure and the total exposure duration.

5. The method of claim 4, wherein the method further comprises:

determining, by the server, a fee for the advertisement using the total exposure duration of the advertisement.

6. The method of claim 1, wherein the method further comprises:

when music content corresponding to which the advertisement is allocated is played, exposing, by the server, the advertisement before, during, or after playing the music content.

7. The method of claim 6, wherein the exposing of the advertisement includes:

when a plurality of advertisements are allocated to the played music content, selecting, by the server, one of the plurality of advertisements as the advertisement and exposing the advertisement.

8. The method of claim 1, wherein the method further comprises:

determining, by the server, an advertisement exposure period;

acquiring, by the server, one or more advertisements allocated to one or more music contents being played during the advertisement exposure period; and exposing, by the server, one of the acquired one or more advertisements.

* * * * *